Patented Nov. 27, 1945

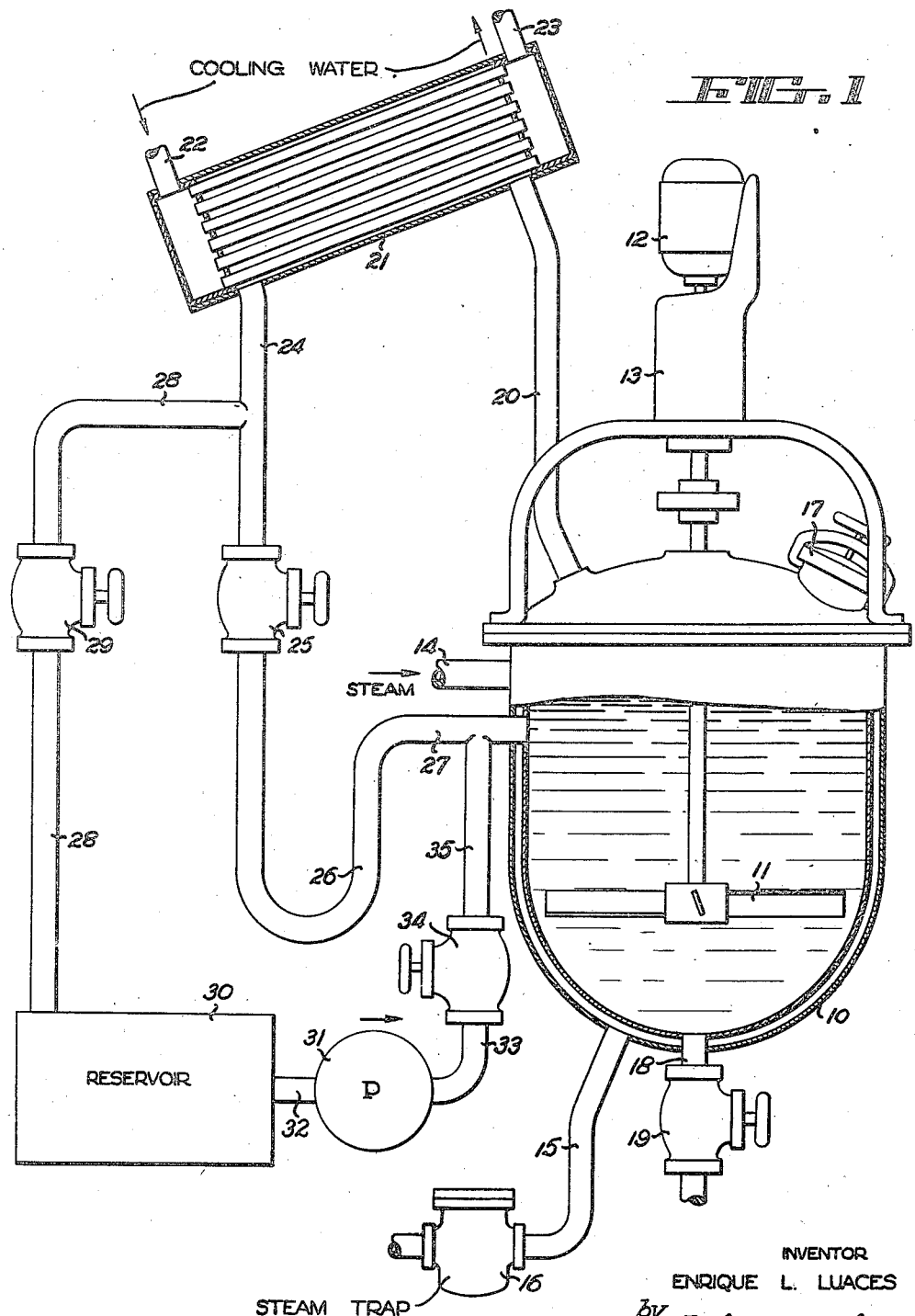

2,389,794

UNITED STATES PATENT OFFICE 2,389,794

WRINKLE COATING FROM NONCONJUGATED OILS

Enrique L. Luáces, Dayton, Ohio, assignor to New Wrinkle, Inc., Wilmington, Del., a corporation of Delaware Application January 23, 1942, Serial No. 427,962

1 Claim. (Cl. 260—22)

This invention relates to wrinkle coating compositions, and more particularly to wrinkle coatings prepared from nonconjugated oils.

There exist in nature only two native oils which possess the characteristic of imparting to coating compositions wherein they are used the ability to yield a wrinkled surface when such compositions are applied and baked. These oils are tung oil and oiticica oil, neither one of which is obtainable in large quantities from domestic sources and both of which are obtained from comparatively inaccessible localities and are subjected to marked fluctuations in price and quality.

Both of these oils are characterized by the fact that they possess in their structure polyconjugated double bonds. It is generally assumed that these conjugated double bonds are responsible for the extreme drying capacity of these oils. Oiticica oil also includes in its structure a keto group, and it is believed that this accounts for certain of the differences which characterize the behaviour of oiticica oil as compared with tung oil.

Tung oil and oiticica oil may be and are frequently used in their natural state in the production of wrinkle coating compositions; however, it is advantageous to subject them to pretreatment, as by blowing or kettling, for the purpose of either enhancing the wrinkling tendency of the oil or for the purpose of reducing the cooking time and thereby increasing the output of the varnish kettles.

The nature of the pretreatment to which these oils are subjected will depend not only on the purpose for which the oil is to be used, but also on the specific oil to be treated. For example, blowing will markedly enhance the wrinkling tendency of tung oil; but, in certain instances, it would prove detrimental if applied to oiticica oil. On the other hand, the wrinkling tendency of oiticica oil would be substantially destroyed if it were to be treated at temperatures such as generally utilized in the treatment of tung oil. This is brought out in copending application Serial No. 425,543, filed January 3, 1942, by W. A. Waldie.

Because of the unfavorable price and quality fluctuations of tung and oiticica oils, coupled with their limited supply and relative inaccessibility of the crop, efforts have been made to develop satisfactory substitutes or replacements utilizing oils, the quality and price of which are less subjected to fluctuations and which may be obtained plentifully from domestic sources.

For example, as disclosed in copending application Serial No. 312,742, filed January 6, 1940, by F. E. Drummond and W. A. Waldie, blown dehydrated castor oil has been used as a substitute for the costly drying oils previously used in the preparation of wrinkle varnish base. Castor oil in its native state is a nondrying oil. Its chief constituent, ricinoleic acid, has only one double bond and therefore does not have the reactivity necessary to impart drying power to the oil. It does contain, however, a hydroxyl group and it has been found possible to remove the hydroxyl group, together with an adjoining hydrogen, in the form of water from ricinoleic acid or its triglyceride and in so doing to introduce a second double bond into the molecule. Castor oil can thus be converted into a drying oil by effecting a substantially complete dehydration by removing one molecule of water from each radical of ricinoleic acid or a total of three molecules from the triglyceride of this acid.

While the dehydration of castor oil results in an increase in its drying capacity, the dehydrated product does not possess the marked drying characteristics of tung and oiticica oils, nor does it exhibit the decided wrinkling tendencies of these oils. However, dehydrated castor oil may be converted into a valuable wrinkling oil by blowing.

Other drying and semidrying oils such as linseed, perilla and soya bean having double bonds in their structure, or mixtures of such oils, may be given marked wrinkling tendencies by blowing.

It is interesting to consider the type of reaction which may take place when an oil is blown with air at elevated temperature and to compare these possible reactions with those which may occur when an oil is "kettled" or bodied by the application of heat.

When an oil such as linseed oil, for example, is heated in a kettle, the reactions which take place may be generally considered to be of a polymerization or association type involving either direct chemical union by primary valence forces, or some sort of grouping of two or more molecules involving secondary valence forces. Many other reactions, the nature of which is not known and which may involve colloidal concepts, may be also involved, but the predominant reaction which leads to an increase in viscosity of the oil is no doubt a polymerization or association of the sort hereinbefore mentioned.

As the heat bodying of the oil progresses, the degree of polymerization or association increases and gradually the oil becomes less and less soluble or dispersible in mineral spirits and other types of oil solvents. The oil will finally set to a solid gel characterized by substantial insolubility in mineral spirits and other typical oil solvents.

On the other hand, if oxygen (as in the form of air) were to be reacted with the linseed oil under the influence of heat, as is the case in the usual blowing operation, it is possible that a peroxide is formed which later on may be rearranged to form alpha-hydroxy ketones.

It is considered that when the oil is simply heat bodied or kettled, the reaction which takes place is largely polymerization, but when the oil is subjected to blowing polymerization as well as oxidation may possibly take place.

When the blowing operation is carried out at temperatures lower than customary, it is believed that oxidation preferentially takes place and a finished product is obtained which has distinguishing characteristics as compared with the same oil when subjected to the ordinary type of blowing.

Kettling or heat bodying is employed primarily for the purpose of reducing the time required for cooking a given batch of varnish and thereby increasing the output of the varnish kettle, while blowing is employed not only to increase the viscosity of the oil but to change its chemical constitution by the addition of oxygen molecules. However, the temperature at which blowing is generally carried out results in the absorption by the oil of large amounts of air which remains chemically uncombined and intermolecularly dispersed. This absorbed air, during storage of the oil, causes auto-oxidation and a gradual increase in the viscosity of the oil and ultimately leads to partial gelation and precipitation thereof. It will be understood by those skilled in the art that when the oil in a coating composition gels and precipitates out, this causes "blobs" or agglomerates and a lack of uniformity in the consistency of the oil. These "blobs" serve to plug up the spray head of spray guns with which it is applied and, consequently, a coating composition exhibiting such an undesirable characteristic is considered an inferior product.

As has been noted above, dehydrated castor oil when subjected to blowing, as well as natural drying and semidrying oils possessing double bonds in their structure, may be utilized in wrinkle coating compositions if previously subjected to blowing; however, it has been considered impossible hitherto to incorporate more than small amounts of substantially nondrying oils in wrinkle coating compositions because of their extreme resistance to oxidation, since rapid surface oxidation is a prerequisite for wrinkle formation.

According to the present invention, it is possible to utilize nonconjugated oils having low oxidation propensity in the production of wrinkle coating compositions. The oils which are made available for use according to the present invention include oils which are plentifully available from domestic sources and the quality and price of which are not subjected to extreme fluctuations. It is thus possible, by the practice of the present invention, to free the industry from the necessity of using costly, ununiform, foreign oils, the supply of which is limited and undependable.

The present invention will be more clearly understood by reference to the following description taken in connection with the annexed drawing, in which:

10 is a jacketed kettle provided with an agitator 11 driven by a motor 12 through a speed reducer 13. The jacket of the kettle 10 is supplied with steam or other heating medium through inlet pipe 14 and the condensate is removed through condensate line 15 and steam trap 16. The kettle 10 is provided with a manhole 17 for charging the kettle and a drain 18 provided with a valve 19 for emptying the kettle. The kettle 10 is further provided with a distillate outlet line 20 connected with a condenser 21 through which cooling water, or other fluid, is circulated through inlet pipe 22 and outlet pipe 23. The condensate from the condenser 21 is returned to the kettle through condensate line 24, valve 25, gooseneck or liquid seal 26 and line 27. A by-pass 28, provided with a valve 29, connects with condensate line 24 and a reservoir or storage tank 30. A pump 31 is connected to the reservoir 30 through line 32 and discharges fluid taken from reservoir 30 through line 33, valve 34 and line 35, the latter being connected with line 27.

In the practice of my invention an oil having nonconjugated double bonds in its structure is caused to react at elevated temperature with an alcoholic solution of an alkali metal hydroxide under reflux and the reaction is continued until a sample withdrawn from the reaction vessel shows the desired degree of conjugation as determined by any suitable method. When this stage of the reaction has been reached the alcohol is removed by distillation and recovered for re-use by condensation. The fatty acids are precipitated out by acidifying the mixture and washing to remove foreign matter. To the residue there is then added a suitable quantity of glycerin and the batch heated to bring about re-esterification of the fatty acids to a mono-, di-, or triglyceride, thus producing a synthetic oil possessing a high proportion of conjugated double bonds from an oil normally possessing none. This synthetic oil may be used in the manufacture of wrinkle coating compositions.

As an alternative procedure, I may react an oil having nonconjugated double bonds in its structure with alkali metal alcoholate in alcohol solution. The reaction is carried out at elevated temperature under reflux for time sufficient to produce the desired degree of conjugation. The alcohol is then recovered for re-use by condensation and the residue treated as hereinbefore described to isolate the fatty acids, which are then re-esterified to produce a synthetic oil usable in wrinkle coating compositions.

A further and preferred procedure is to react an oil with alcoholic alkali metal hydroxide at elevated temperature and under reflux for time sufficient to produce the desired degree of conjugation of the double bonds in the structure of the oil. When this has been attained, the alcohol is removed by distillation and saved for future use. The fatty acids are isolated as hereinbefore described, a polybasic acid or anhydride and a polybasic alcohol added, and the whole heated further until a drop deposited on glass shows clear. Thereupon there is added to the batch a suitable amount of a "top drier" such as cobalt naphthenate, together with hydrocarbon diluent in quantity sufficient to produce a sprayable composition. The resulting product, when applied to a surface and baked, will give a tough, hard, wrinkled film of uniform texture.

As a modification of this preferred procedure, I may react an oil having nonconjugated double bonds in its structure with an alkali metal alcoholate in alcohol solution. The reaction is carried out under reflux for time sufficient to produce the desired degree of conjugation. The alcohol is then removed by distillation and saved for future use. The fatty acids are then precipitated and separated out and there is added to them a polycarboxylic acid or anhydride such as maleic acid or phthalic acid or their anhydrides and a polyhydric alcohol such as glycerol or glycol and the whole heated further until a drop deposited on glass shows clear. Thereupon there is added to the batch a quantity of a "top drier," together with hydrocarbon diluent in quantity sufficient to give a sprayable product. The resulting product, when applied on a surface and baked, will, likewise, give a hard, tough, wrinkled film of uniform and pleasing texture.

Without thereby intending to limit my invention to the specific details disclosed, I shall now describe some typical procedures which may be followed advantageously in the practice of my invention.

Example I

A quantity of cottonseed oil is placed in the kettle 10, together with an excess of alcoholic potassium hydroxide. The alcoholic potassium hydroxide may be in the form of a 20 per cent solution, and the molal proportion of oil to hydroxide may be of the order of from 1:4 to 1:5. The manhole 17 is then tightly closed; the motor 12 is set in motion to drive the agitator 11 through speed reducer 13; and steam is introduced into the jacket of kettle 10 through line 14 for the purpose of heating the contents of the kettle.

As the temperature of the batch increases alcohol vapors will be driven out of the kettle through line 20 and into condenser 21 which is cooled by introducing water through line 22 and discharging it through line 23. Condensate will leave the condenser 21 through line 24, and passing through valve 25 (which will be open), gooseneck 26 and line 27 will be returned to the kettle 10. This will serve to maintain a constant or uniform concentration of alcohol in the batch. It will be understood that valves 29, 34 and 19 remain closed throughout this operation.

Samples are withdrawn from the kettle 10 from time to time and the degree of conjugation is determined on them. This may be done, for example, by determining the iodine number, or the diene value, or the samples may be spectrographically analyzed. When the required or desired degree of conjugation has been reached, valve 29 is opened and valve 25 is closed, whereby the condensate from condenser 21 will flow through lines 24 and 28 and valve 29 to reservoir 30, wherein it is stored for future use. The contents of the kettle may then be transferred to a separate vessel for the purpose of separating the treated soap from the residual saponifying reagent and for the purpose of isolating the fatty acids; however, these operations, if desired, may be carried out in the kettle 10, although this would not be good commercial practice.

The treated soap resulting from the above procedure is acidified, and the precipitated fatty acids are separated. These fatty acids are transferred to a vessel such as jacketed kettle 10 and there subjected to the action of heat. When the temperature has reached about 400° F. glycerol and phthalic anhydride are added in quantity sufficient to produce a mixture comprising by weight 60 parts of glycerol, 120 parts of phthalic anhydride, and 102 parts of fatty acids, all values being approximate. The mixture is agitated continuously and preferably in the absence of an oxidizing atmosphere until the reaction has proceeded to the desired extent as indicated by the acid number of the product obtained. When this point has been reached the batch is permitted to cool down to a temperature of approximately 350° F., whereupon there is added to the batch a quantity of "top drier" such as cobalt naphthenate, together with hydrocarbon diluent in quantity sufficient to reduce the consistency of the batch to a sprayable condition at room temperature. The amount of "top drier" necessary will be in the neighborhood of from 0.5 to 3 per cent depending on the texture required. The composition resulting from the above procedure, when applied on a surface and baked, will yield a tough, hard, wrinkled surface of uniform and pleasing texture.

It will be understood that a concentrated alcoholic solution of potassium hydroxide may be added to the kettle 10 through manhole 17 and the balance of the alcohol required added by pump 31 through lines 32 and 33, valve 34 and lines 35 and 27 (valve 25 being closed) from reservoir 30. On the other hand, an alcoholic KOH solution of the desired concentration may be placed in the reservoir 30 and introduced into the kettle by pumping.

Example II

A quantity of corn oil is placed in the kettle, together with an excess of sodium ethylate in alcohol solution in which the ethylate content is 20 per cent, and the molal proportion of oil to alkali may be of the order of from 1:4 to 1:5. The batch is treated in the same manner as hereinbefore described in Example I.

The treated soap resulting from the treatment of the oil with the alcoholate is acidified to separate the fatty acids. These fatty acids are treated in the same manner as described in Example I and the product resulting therefrom will be a wrinkle coating composition having substantially the same characteristics as the wrinkle coating composition resulting from the practice of the method described in Example I.

Example III

A quantity of peanut oil is placed in the kettle, together with a molal excess of alcoholic ammonia. The batch is processed substantially as described in Example I until a sample withdrawn from the reaction vessel shows the proper degree of conjugation, whereupon the alcohol and ammonia are removed by distillation, all of the former and as much of the latter as possible being recovered for re-use.

The residue in the kettle is heated further at a temperature of approximately 500° F. for the purpose of breaking down the soap formed during the saponification reaction and to bring about re-esterification of the resulting free fatty acids by the glycerin which separated on saponification of the oil.

The temperature is then reduced to approximately 400° F., whereupon there is added to the kettle glycerol and phthalic anhydride in quantity sufficient to yield the ratio set forth in Example I. The mixture is agitated continuously and treated further as indicated in Example I. The resulting composition will yield a tough, hard, wrinkled surface of uniform texture when applied on a surface and baked.

Example IV

A quantity of cottonseed oil is placed in the kettle, together with a quantity of potassium hydroxide dissolved in glycerol sufficient to yield a molal proportion of oil to hydroxide of the order of from 1:4 to 1:5. The amount of glycerol to be used should be sufficient to provide thorough distribution and intermingling of the oil and hydroxide.

The reaction is carried out under reflux at a temperature of approximately 400° F. until a sample withdrawn from the batch indicates that the desired degree of conjugation of the oil has been obtained. The soap resulting from the above operation is acidified to precipitate the fatty acids which are then further treated at elevated temperature in the presence of polyhydric alcohol and polybasic acid as set forth in Example I.

It will be understood that in the practice of my invention I may utilize alkali metal alcoholates of various sorts such as ethylate, methylate, butylate, isoamylate, etc., and that any of the alcohol soluble alkali metals may be employed, although I prefer to use sodium and potassium alcoholates.

It will be also understood that in the practice of my invention I can make use of other polyhydric alcohols in place of glycerol, as for example, polyglycerol, the glycols, polyglycols, mannitol, sorbitol, etc.; and that other polycarboxylic acids such as malic, maleic, fumaric, succinic, citric, tartaric, mucic, benzoyl-benzoic, and their anhydrides may be used in place of the phthalic anhydride employed in the examples.

The selection of thinner is not critical although preference should be given to those products of high volatility such as toluol, xylol, light naphtha, etc.; all of which may be used satisfactorily in the practice of my invention.

Likewise, many different driers may be used so long as they are of the type possessing the inherent characteristic of bringing about a rapid formation of a skin on the exposed surface of the film in order to cause the changes in volume between the surface of the film and the interior thereof which lead to the production of wrinkled surfaces. The resinate, linoleate, or naphthenate type of drier, characterized by ready solubility, proves very suitable for this purpose.

It will be appreciated from what has been stated hereinbefore that in the practice of my invention I make use of oils, the nature of which in their natural state is such as to render them unsuitable for use in rapid drying coating compositions, and that according to the method of my invention, I am able satisfactorily and economically to convert such oils into synthetic oils or fatty acids which are eminently well adapted for use in the manufacture of wrinkle coating compositions. Furthermore, it will be appreciated by those skilled in the art that wrinkle compositions such as produced according to the method of my invention may be produced from oils plentifully available from domestic sources and the price and quality of which are not subjected to marked fluctuations. In addition, the wrinkle coating compositions produced according to the method of my invention yield hard, tough films which are adapted to form a surface of uniform wrinkled texture when baked.

It will be understood that the apparatus illustrated in the annexed drawing is purely illustrative and that I do not limit myself to the use of such an apparatus in the practice of the method of my invention. In addition, any theories advanced herein are offered simply as explanatory matter and not as limitations on my invention.

Furthermore, it will be understood that while I have herein set forth certain specific embodiments of my invention, it is not my intention to have it limited to or circumscribed by the specific details of procedure and proportions indicated, since my invention is adapted to be modified according to individual preference and conditions within the scope of the appended claim.

I claim:

A wrinkle coating composition comprising a resin resulting from the reaction at 400° F. of 60 parts of glycerol, 120 parts of phthalic anhydride and 102 parts of fatty acids; from 0.5 to 3 per cent of a top drier; and hydrocarbon diluent; said fatty acids having been produced by the treatment of an oil selected from the group consisting of cotton-seed oil, corn oil and peanut oil with an alcoholic ammonia solution under reflux to cause rearrangement of the non-conjugated double bonds in the acid radicals of the oil to conjugated double bonds and to cause formation of fatty acid soaps, and then isolating the fatty acids.

ENRIQUE L. LUÁCES.